(12) United States Patent
Hwang et al.

(10) Patent No.: US 10,913,847 B2
(45) Date of Patent: Feb. 9, 2021

(54) COPOLYESTER HAVING LOW MELTING POINT AND HIGH CRYSTALLINITY

(71) Applicant: FAR EASTERN NEW CENTURY CORPORATION, Taipei (TW)

(72) Inventors: Der-Ren Hwang, Taipei (TW); Cheng-Ting Wang, Taipei (TW); Lin-Chien Yu, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 26 days.

(21) Appl. No.: 16/440,694

(22) Filed: Jun. 13, 2019

(65) Prior Publication Data
US 2020/0224024 A1    Jul. 16, 2020

(30) Foreign Application Priority Data
Jan. 16, 2019   (TW) .............................. 108101594 A

(51) Int. Cl.
*C08L 67/02*    (2006.01)
*C08G 63/06*    (2006.01)
*C08G 63/181*   (2006.01)

(52) U.S. Cl.
CPC .............. *C08L 67/02* (2013.01); *C08G 63/06* (2013.01); *C08G 63/181* (2013.01); *C08L 2203/12* (2013.01)

(58) Field of Classification Search
USPC .......................... 528/190, 193, 194, 271, 272
See application file for complete search history.

(56) References Cited

U.S. PATENT DOCUMENTS

2013/0029068 A1 *   1/2013   Treece .................... C08L 67/02
                                                              428/35.7

* cited by examiner

*Primary Examiner* — Terressa Boykin
(74) *Attorney, Agent, or Firm* — MLO, a professional corp.

(57) ABSTRACT

A copolyester having a low melting point and a high crystallinity includes a first recurring unit, a second recurring unit, and a third recurring unit, which are respectively represented by Formulas (I), (II), and (III) defined herein. A molar ratio of the first recurring unit to the second recurring unit ranges from 1:0.5 to 1:3, and a molar ratio of the first recurring unit to the third recurring unit ranges from 1:1.3 to 1:8. The copolyester may have a melting point lower than 220° C. and a lattice enthalpy greater than 12 J/g. A process for producing the copolyester and a fiber made from the copolyester are also disclosed.

10 Claims, 1 Drawing Sheet

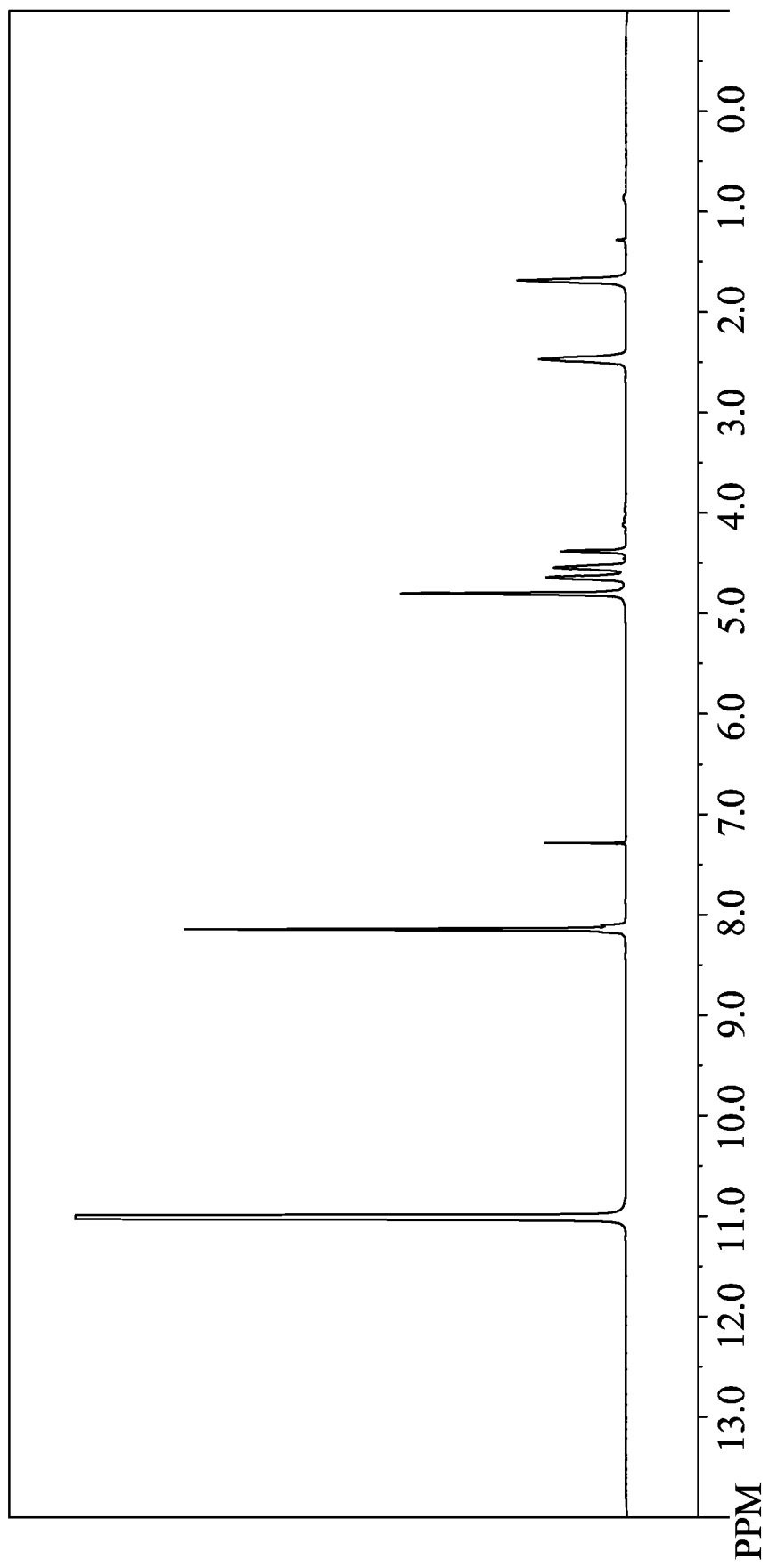

COPOLYESTER HAVING LOW MELTING POINT AND HIGH CRYSTALLINITY

CROSS-REFERENCE TO RELATED APPLICATION

This application claims priority of Taiwanese Invention Patent Application No. 108101594, filed on Jan. 16, 2019.

FIELD

This disclosure relates to a copolyester, and more particularly to a copolyester having a low melting point and a high crystallinity. This disclosure also relates to a process for preparing the copolyester and a fiber made from the copolyester.

BACKGROUND

An unmodified polyester material usually has a high melting point (for instance, polyethylene terephthalate has a melting point of 260° C.), and thus a temperature for processing the unmodified polyester material is relatively high, thereby limiting potential applications of the unmodified polyester material. Therefore, the polyester material is usually modified to have a lower melting point. In addition, such modified polyester may be spun into polyester fibers having a low melting point.

The polyester fibers having a low melting point may be used as, for example, thermal bonding fibers for making a fabric of an inner ceiling of a car roof. The fabric may be made by thermal bonding of the polyester fibers and matrix fibers. The matrix fibers may include polypropylene fibers and/or polyethylene fibers.

Polyester fibers for making the inner ceiling of a car are usually required to have a low melting point (i.e., lower than 220° C.). This is because a melting point of the polypropylene fibers is approximately 160° C. If the melting point of the polyester fibers is not low enough, thermal bonding of the polypropylene fibers and the polyester fibers may need to be operated under a relatively high temperature for melting the polyester fibers, which may cause thermal decomposition of the polypropylene fibers, resulting in a poor physical property of the fabric for the inner ceiling. On the other hand, when the polyester fibers have insufficient crystallinity, the fabric for the inner ceiling may be deteriorated when the car is exposed to direct sunlight. To provide a fabric for an inner ceiling which can withstand a high temperature, polyester fibers for making the fabric are further required to have a lattice enthalpy of more than 12 J/g.

Chinese Patent No. 102276808A discloses a method of making a copolymer of polyethylene terephthalate and polyethylene oxalate. The copolymer is made by reacting oxalate with terephthalic acid and an ester thereof, and ethylene glycol. A molar ratio of a total amount of acids and esters (i.e., oxalate, terephthalic acid and an ester thereof) to a total amount of ethylene glycol is in a range from 1:10 to 1:2.5. The amount of oxalate ranges from 2 mol % to 80 mol % based on the total amount of the acids and the esters, and 0.1 mol % to 10 mol % of terephthalic acid or the ester thereof may be replaced with a small amount of other types of dicarboxylic acids or esters thereof (i.e., the amount of oxalate ranges from 2 mol % to 80 mol % and the amount of the other types of dicarboxylic acids or the esters thereof ranges from 0.2 mol % to 9.8 mol % based on the total amount of acids and esters). Examples of other types of dicarboxylic acids may include, but are not limited to, isophthalic acid, phthalic acid, 2,6-naphthalenedicarboxylic acid, 4,4'-biphenyldicarboxylic acid, 4,4'-oxybisbenzoic acid, 5-sulfoisophthalic acid monosodium salt, 1,4-butanedioic acid, 1,6-hexanedioic acid, decanedioic acid, 1,4-cyclohexanedicarboxylic acid, etc. By adding and then copolymerizing the aforementioned types of dicarboxylic acids, the melting point of the resulting copolymer can be further lowered. The copolymer made by the method disclosed in the Chinese Patent No. 102276808A has a melting point ranging from 210° C. to 250° C.

Although the copolymer made by the conventional method has a relatively low melting point (210° C. to 250° C.), the copolymer still has a relatively low lattice enthalpy. As such, the copolymer is less likely to be used for making a fabric of an inner ceiling of a car.

SUMMARY

Therefore, a first object of the disclosure is to provide a copolyester having a low melting point and a high crystallinity. A second object of the disclosure is to provide a process for preparing the copolyester. A third object is to provide a fiber made from a composition including the copolyester.

According to a first aspect of the disclosure, a copolyester having a low melting point and a high crystallinity includes:
a first recurring unit represented by Formula (I);
a second recurring unit represented by Formula (II); and
a third recurring unit represented by Formula (III),

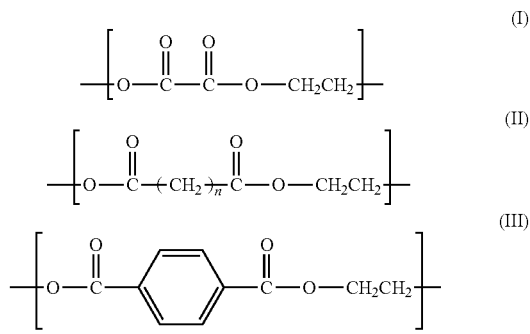

wherein
n is an integer in a range from 1 to 12;
a molar ratio of the first recurring unit to the second recurring unit is in a range from 1:0.5 to 1:3; and
a molar ratio of the first recurring unit to the third recurring unit is in a range from 1:1.3 to 1:8.

According to a second aspect of the disclosure, a process for preparing a copolyester having a low melting point and a high crystallinity includes the steps of:

a) subjecting ethylene glycol to a reaction with oxalic acid or an ester thereof to form a first reaction product, the oxalic acid or the ester thereof being represented by $R^1OOC—COOR^2$, in which each of $R^1$ and $R^2$ is independently hydrogen or an alkyl group;

b) subjecting ethylene glycol to a reaction with aliphatic dicarboxylic acid or an ester thereof to form a second reaction product, the aliphatic dicarboxylic acid or the ester thereof being represented by $R^3OOC—(CH_2)_n—COOR^4$, in which each of $R^3$ and $R^4$ is independently hydrogen or an alkyl group;

c) subjecting ethylene glycol to a reaction with aromatic dicarboxylic acid or an ester thereof to form a third reaction product, the aromatic dicarboxylic acid or the ester thereof being represented by

in which each of $R^5$ and $R^6$ is independently hydrogen or an alkyl group; and d) subjecting the first reaction product, the second reaction product, and the third reaction product to a polycondensation reaction, wherein the aliphatic dicarboxylic acid or the ester thereof is in an amount ranging from 15 mol % to 30 mol %, and the oxalic acid or the ester thereof is in an amount ranging from 10 mol % to 30 mol % based on a total molar amount of the oxalic acid or the ester thereof, the aliphatic dicarboxylic acid or the ester thereof, and the aromatic dicarboxylic acid or the ester thereof.

According to a third aspect of the disclosure, a fiber is made from a composition including the aforementioned copolyester.

In the process of the disclosure, by controlling specific ranges of molar ratios among the first, second and third recurring units as defined above, the copolyester having a low melting point and a high crystallinity can be obtained. The copolyester may have a melting point lower than 220° C., and a lattice enthalpy greater than 12 J/g. As such, the copolyester may be processed at a relatively low temperature and may have a high resistance to high temperature, and thus is useful for various applications, such as a fabric for an inner ceiling of a car.

BRIEF DESCRIPTION OF THE DRAWINGS

Other features and advantages of the disclosure will become apparent in the following detailed description of the embodiment (s) with reference to the accompanying drawing, of which:

FIG. 1 is an NMR spectrum of a copolyester of Example 1.

DETAILED DESCRIPTION

Copolyester having a low melting point and a high crystallinity:

A copolyester having a low melting point and a high crystallinity according to an embodiment of the disclosure includes:

a first recurring unit represented by Formula (I);
a second recurring unit represented by Formula (II); and
a third recurring unit represented by Formula (III),

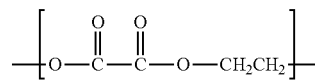

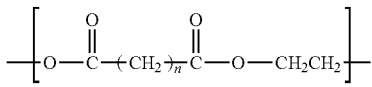

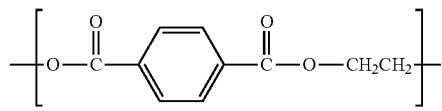

wherein
n is an integer in a range of 1 to 12;
a molar ratio of the first recurring unit to the second recurring unit is in a range from 1:0.5 to 1:3; and
a molar ratio of the first recurring unit to the third recurring unit is in a range from 1:1.3 to 1:8.

In certain embodiments, n is 1, 2, 3, 4, 5, 6, 7, 8, 10, or 12.

In certain embodiments, n is 2, 4, 6, 8, 10, or 12.

In certain embodiments, n is 3, 4, or 10.

In certain embodiments, an intrinsic viscosity of the copolyester ranges from 0.55 to 0.85.

In certain embodiments, the copolyester has a melting point lower than 220° C., and a lattice enthalpy greater than 12 J/g. In certain embodiments, the lattice enthalpy of the copolyester is greater than 15 J/g. In certain embodiments, the lattice enthalpy of the copolyester is greater than 20 J/g.

Process for Preparing Copolyester:

A process for preparing a copolyester having a low melting point and a high crystallinity according to an embodiment of the disclosure includes:

a) subjecting ethylene glycol to a reaction with oxalic acid or an ester thereof to form a first reaction product;

b) subjecting ethylene glycol to a reaction with an aliphatic dicarboxylic acid or an ester thereof to form a second reaction product;

c) subjecting ethylene glycol to a reaction with an aromatic dicarboxylic acid or an ester thereof to form a third reaction product; and d) subjecting the first reaction product, the second reaction product, and the third reaction product to a polycondensation reaction.

In step a), the oxalic acid or the ester thereof is represented by $R^1OOC$—$COOR^2$, in which each of $R^1$ and $R^2$ is independently hydrogen or an alkyl group. In certain embodiments, the oxalic acid or the ester thereof may be oxalic acid, alkyl oxalate, dialkyl oxalate, or combinations thereof. Examples of the alkyl group in $R^1$ or $R^2$ may include, but are not limited to, $C_1$ to $C_8$ linear alkyl, and $C_3$ to $C_8$ branched alkyl.

In step b), the aliphatic dicarboxylic acid or the ester thereof is represented by $R^3OOC$—$(CH_2)_n$—$COOR^4$, in which n is an integer of from 1 to 12, and each of $R^3$ and $R^4$ is independently hydrogen or an alkyl group. In certain embodiments, n is 1, 2, 3, 4, 5, 6, 7, 8, 10, or 12. In certain embodiments, n is 2, 4, 6, 8, 10, or 12. In certain embodiments, n is 3, 4, or 10. Examples of the aliphatic dicarboxylic acid and the ester thereof are shown in Table 1 below. Examples of the alkyl group in $R^3$ or $R^4$ may include, but are not limited to, $C_1$ to $C_8$ linear alkyl and $C_3$ to $C_8$ branched alkyl. In addition, the examples listed in Table 1 below may be used alone or in combinations of two or more thereof.

TABLE 1

| | $R^3OOC$—$(CH_2)_n$—$COOR^4$ | | |
|---|---|---|---|
| n | $R^3$ = hydrogen $R^4$ = hydrogen | $R^3$ = alkyl group $R^4$ = alkyl group | $R^3$ = hydrogen $R^4$ = alkyl group |
| 1 | Propanedioic acid | Dialkyl malonate | Alkyl malonate |
| 2 | Butanedioic acid | Dialkyl succinate | Alkyl succinate |

TABLE 1-continued

| | | $R^3OOC-(CH_2)_n-COOR^4$ | |
|---|---|---|---|
| n | $R^3$ = hydrogen $R^4$ = hydrogen | $R^3$ = alkyl group $R^4$ = alkyl group | $R^3$ = hydrogen $R^4$ = alkyl group |
| 3 | Pentanedioic acid | Dialkyl glutarate | Alkyl glutarate |
| 4 | Hexanedioic acid | Dialkyl adipate | Alkyl adipate |
| 5 | Heptanedioic acid | Dialkyl pimelate | Alkyl pimelate |
| 6 | Octanedioic acid | Dialkyl suberate | Alkyl suberate |
| 7 | Nonanedioic acid | Dialkyl azelate | Alkyl azelate |
| 8 | Decanedioic acid | Dialkyl sebacate | Alkyl sebacate |
| 10 | Dodecanedioic acid | Dialkyl dodecanedioate | Alkyl dodecanedioate |
| 12 | Tetradecanedioic acid | Dialkyl tetradecanedioate | Alkyl tetradecanedioate |

In step c), the aromatic dicarboxylic acid or the ester thereof is represented by

in which each of $R^5$ and $R^6$ is independently hydrogen or an alkyl group. In certain embodiments, the aromatic dicarboxylic acid or the ester thereof may be terephthalic acid, alkyl terephthalate, dialkyl terephthalate, or combinations thereof. Examples of the alkyl group in $R^5$ or $R^6$ may include, but are not limited to, $C_1$ to $C_8$ linear alkyl and $C_3$ to $C_8$ branched alkyl.

The aliphatic dicarboxylic acid or the ester thereof is in an amount ranging from 15 mol % to 30 mol %, and the oxalic acid or the ester thereof is in an amount ranging from 10 mol % to 30 mol % based on a total molar amount of the oxalic acid or the ester thereof, the aliphatic dicarboxylic acid or the ester thereof, and the aromatic dicarboxylic acid or the ester thereof.

In certain embodiments, steps a), b), and c) are implemented by mixing the ethylene glycol, the oxalic acid or the ester thereof, the aliphatic dicarboxylic acid or the ester thereof, and the aromatic dicarboxylic acid or the ester thereof to obtain a mixture, followed by subjecting the mixture to esterification and/or transesterification. A reaction temperature for step a) is the lowest, a reaction temperature for step c) is the highest, and a reaction temperature for step b) is between those of steps a) and c). Therefore, by raising the temperature of the mixture, steps a), b), and c) are implemented sequentially to obtain the first, second, and third reaction products. Finally, the first, second, and third reaction products are subjected to a polycondensation reaction, thereby obtaining the copolyester having a low melting point and a high crystallinity.

The esterification and/or transesterification may be implemented in a manner well-known in the art, and may be modified based on requirements.

In certain embodiments, the reaction temperature for the esterification and/or transesterification may be in a range of, for example, but is not limited to, 100° C. to 260° C., and the reaction temperature may be raised stepwise to permit steps a), b), c) to be implemented sequentially. In certain embodiments, the reaction temperature for step a) is in a range from 100° C. to 180° C., the reaction temperature for step b) is in a range from 160° C. to 240° C., and the reaction temperature for step c) is in a range from 190° C. to 260° C.

In certain embodiments, the reaction pressure for the esterification and/or transesterification is in a range of, for example, but is not limited to, −0.5 to 3 atm.

Step d) may be implemented, for example, but is not limited to, when the conversion rate of the aforementioned esterification and/or transesterification reaches 80% or above. Step d) may be implemented in a manner well-known in the art, and may be modified based on requirements.

In certain embodiments, step d) is implemented in the presence of a catalyst, for example, transition metals. Examples of the transition metals include, for example, but are not limited to, antimony-containing compounds, tin-containing compounds, titanium-containing compounds, gallium-containing compounds, and aluminum-containing compounds. The transition metals for the catalyst may be used alone or in combinations of two or more thereof. Examples of the catalyst may include, but are not limited to, antimony(III) oxide ($Sb_2O_3$), antimony(III) acetate, ethylene glycol antimony, titanium isopropoxide, titanium butoxide, dibutyltin oxide, Tin(II) 2-ethylhexanoate, and combinations thereof. The amount of the catalyst may be adjusted based on requirements. The timing of adding the catalyst may be, for example, but is not limited to, when the conversion rate of the aforementioned esterification and/or transesterification reaction reaches 80% or above. Step d) may be implemented using any temperature and pressure that permit the polycondensation reaction. For example, the temperature of step d) may range from 200° C. to 280° C., and a pressure of step d) may range from 0.1 to 10 torr.

Polyester Fiber Having a Low Melting Point and a High Crystallinity

A polyester fiber having a low melting point and a high crystallinity according to an embodiment of the disclosure is made from a composition including the aforementioned copolyester.

The polyester fiber may be made by any suitable process, for example, a melt spinning process, but is not limited thereto. Details for the melt spinning process are well-known in the art, and thus are omitted herein for the sake of brevity.

In certain embodiments, a melt spinning equipment may be used for melt spinning the copolyester into the polyester fibers. The melt spinning equipment may include a plurality of spinning nozzles each having a diameter in a range from 0.2 to 0.8 mm.

In certain embodiments, the melt spinning process has a temperature in a range from 170° C. to 240° C. In certain embodiments, the melt spinning process has a temperature in a range from 180° C. to 240° C.

The polyester fiber may be of either a continuous filament shape or a short staple fiber shape.

In certain embodiments, the polyester fiber has a melting point in a range from 140° C. to 220° C.

Applications for the polyester fiber may include, but are not limited to, a fabric for an inner ceiling of a car, an adhesive material for shoes, an adhesive material for non-woven fabric, etc.

In certain embodiments, the copolyester may have a melting point lower than 220° C., and a lattice enthalpy greater than 12 J/g. Therefore, the polyester fibers made from the composition including the copolyester are suitable to serve as thermal binding fibers for making a fabric of an inner ceiling of a car. Because the melting point of the copolyester is lower than 220° C., the process for making the fabric may be conducted at a relatively low temperature. Furthermore, because the lattice enthalpy of the copolyester is greater than 12 J/g, the fabric inside the car may have a high resistance to high temperature and thus is less likely to deteriorate due to an overly high in-car temperature.

Examples of the disclosure will be described hereinafter. It is to be understood that these examples are exemplary and explanatory and should not be construed as a limitation to the disclosure.

Example 1 (EX1)

195.40 g of terephthalic acid (abbreviated as PTA), 85.93 g of adipic acid (abbreviated as AA), 17.66 g of oxalic acid (abbreviated as OX), and 121.64 g of ethylene glycol (abbreviated as EG) were stirred and mixed in a 5-liter reactor to obtain a mixture. The reactor was then filled with nitrogen gas for replacing air inside the reactor until a pressure inside the reactor reached 2 atm. Subsequently, a temperature inside the reactor was raised stepwise to 260° C. under nitrogen atmosphere of 2 atm. In the meanwhile, the mixture was subjected to esterification reaction to permit a distillation rate of esterification water to be more than 80% of the theoretical value. Next, 0.105 g of antimony trioxide was added into the reactor, and then the pressure inside the reactor was gradually reduced to less than 2 torr, followed by polycondensation of esterification products at a temperature of 275° C. The polycondensation reaction proceeded until a stirring power for the reactor reached 140 W, thereby obtaining a copolyester of Example 1.

Examples 2 to 9 (EX 2 to 9) and Comparative Examples 1 to 10 (CE 1 to 10)

The procedures for preparing copolyesters of Examples 2 to 9 and Comparative Examples 1 to 10 were similar to those of Example 1 except that the amounts of PTA, OX, EG, and the types and amounts of aliphatic dicarboxylic acid were varied as shown in Table 2 below.

Evaluations:
1. Differential Scanning Calorimeter (DSC) Test

Melting points (Tm) and lattice enthalpies (ΔHm) of each of the copolyesters of Examples 1 to 9 and Comparative Examples 1 to 10 were measured using a differential scanning calorimeter (DSC) (Manufacturer: TA Instruments, USA; Model: DSC module 2910). In each test, the copolyester was heated from −20° C. to 280° C. at an increment rate of 10° C./min. The results are presented in Table 3. It may be noted that the melting point (Tm) is required to be lower than 220° C., and the lattice enthalpy (ΔHm) is required to be greater than 12 J/g.

2. Intrinsic Viscosity (IV) Test

Each of the copolyesters of Examples 1 to 9 and Comparative Examples 1 to 10 was added to a solution mixture of phenol and tetrachloroethane in which a weight ratio of phenol to tetrachloroethane is 3:2, to formulate a sample solution (concentration: 0.4 wt/vol %). Subsequently, an intrinsic viscosity of the sample solution was measured with an Ubbelohde viscometer under a temperature of 30±0.02° C. The results are presented in Table 3.

3. Structural Analysis of Copolyester

The copolyester of Example 1 was analyzed using a nuclear magnetic resonance (NMR) spectrometer (Bruker AVANCE 300 MHz) to measure a molar ratio of a second recurring unit to a first recurring unit (indicated by "X"), and a molar ratio of the third recurring unit to a first recurring unit (indicated by "Y"). The first recurring unit is represented by

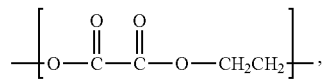

TABLE 2

|    |    | Terephthalic acid (PTA) | | Aliphatic dicarboxylic acid HOOC—(CH₂)ₙ—COOH | | | Oxalic acid (OX) | | Ethylene glycol (EG) | |
|----|----|------|------|----|------|------|------|------|------|------|
|    |    | g | mol % | n | g | mol % | g | mol % | g | mol % |
| EX | 1  | 195.40 | 60  | 4  | 85.93 | 30 | 17.66 | 10 | 121.64 | 100 |
|    | 2  | 142.40 | 40  | 4  | 93.93 | 30 | 57.90 | 30 | 132.97 | 100 |
|    | 3  | 225.44 | 70  | 4  | 56.65 | 20 | 17.46 | 10 | 120.29 | 100 |
|    | 4  | 201.74 | 60  | 4  | 59.14 | 20 | 36.46 | 20 | 125.58 | 100 |
|    | 5  | 175.85 | 50  | 4  | 61.86 | 20 | 57.20 | 30 | 131.36 | 100 |
|    | 6  | 217.29 | 65  | 4  | 44.10 | 15 | 36.25 | 20 | 124.86 | 100 |
|    | 7  | 192.27 | 55  | 4  | 46.12 | 15 | 56.86 | 30 | 130.57 | 100 |
|    | 8  | 205.06 | 60  | 3  | 54.35 | 20 | 37.06 | 20 | 127.65 | 100 |
|    | 9  | 183.86 | 60  | 10 | 84.92 | 20 | 33.23 | 20 | 114.45 | 100 |
| CE | 1  | 232.67 | 70  | 4  | 29.23 | 10 | 36.04 | 20 | 124.14 | 100 |
|    | 2  | 269.27 | 85  | 4  | 13.93 | 5  | 17.18 | 10 | 118.32 | 100 |
|    | 3  | 224.52 | 65  | 4  | 15.19 | 5  | 56.18 | 30 | 129.01 | 100 |
|    | 4  | 288.98 | 95  | 4  | 13.38 | 5  | 0     | 0  | 113.61 | 100 |
|    | 5  | 261.30 | 85  | 4  | 40.56 | 15 | 0     | 0  | 114.81 | 100 |
|    | 6  | 293.28 | 95  | 4  | 0     | 0  | 8.37  | 5  | 115.30 | 100 |
|    | 7  | 283.57 | 90  | 4  | 0     | 0  | 17.08 | 10 | 117.68 | 100 |
|    | 8  | 273.45 | 85  | 4  | 0     | 0  | 26.16 | 15 | 120.16 | 100 |
|    | 9  | 188.64 | 50  | 4  | 0     | 0  | 102.27 | 50 | 140.91 | 100 |
|    | 10 | 302.60 | 100 | —  | 0     | 0  | 0     | 0  | 113.02 | 100 |

Application Example 1 (Polyester Fiber)

The copolyester of Example 4 was melt spun into polyester fibers at 240° C. using a melt spinning equipment with a plurality of spinning nozzles each having a diameter of 0.255 mm.

the second recurring unit is represented by

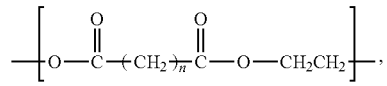

and the third recurring unit is represented by

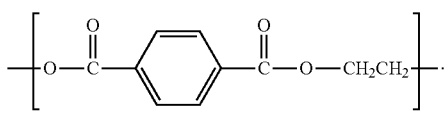

The results are presented in FIG. 1 and Table 3.

FIG. 1 shows an NMR spectrum for the copolyester of Example 1. The molar ratios (X, Y) of the copolyester of Example 1 can be calculated based on ratios of integral values for each of the first, second, third recurring units, which are shown in Table 4.

in the specific molar ranges, and the first, second, and third recurring units (if any) of the copolyesters of Comparative Examples 1 to 10 did not have the abovementioned specific molar ratio.

Results in Table 3 show that the copolyesters of Examples 1 to 9 met the requirements of the DSC test, i.e., a melting point (Tm) lower than 220° C. and a lattice enthalpy (Hm) greater than 12 J/g. In addition, the lattice enthalpy of the copolyester of Example 9 was greater than 15 J/g, and the lattice enthalpies of the copolyesters of Examples 1 to 8 were greater than 20 J/g.

In comparison, the copolyesters of Comparative Examples 1 to 10 failed to meet the requirements for the DSC test.

TABLE 3

| | | PTA mol % | Aliphatic dicarboxylic acid HOOC—(CH₂)ₙ—COOH n | Aliphatic dicarboxylic acid HOOC—(CH₂)ₙ—COOH mol % | OX mol % | EG mol % | ΔHm (J/g) | Tm (° C.) | IV | X | Y |
|---|---|---|---|---|---|---|---|---|---|---|---|
| EX | 1 | 60 | 4 | 30 | 10 | 100 | 22.2 | 176.1 | 0.785 | 2.929 | 5.808 |
| | 2 | 40 | 4 | 30 | 30 | 100 | 22.6 | 160.4 | 0.767 | 1.012 | 1.411 |
| | 3 | 70 | 4 | 20 | 10 | 100 | 31.5 | 199.7 | 0.746 | 2.014 | 7.121 |
| | 4 | 60 | 4 | 20 | 20 | 100 | 28.4 | 191.0 | 0.801 | 1.006 | 3.015 |
| | 5 | 50 | 4 | 20 | 30 | 100 | 25.7 | 183.2 | 0.787 | 0.665 | 1.691 |
| | 6 | 65 | 4 | 15 | 20 | 100 | 30.9 | 212.1 | 0.766 | 0.761 | 3.322 |
| | 7 | 55 | 4 | 15 | 30 | 100 | 34.2 | 210.0 | 0.735 | 0.511 | 1.852 |
| | 8 | 60 | 3 | 20 | 20 | 100 | 25.7 | 195.6 | 0.733 | 1.023 | 3.211 |
| | 9 | 60 | 10 | 20 | 20 | 100 | 17.2 | 187.7 | 0.784 | 1.031 | 3.134 |
| CE | 1 | 70 | 4 | 10 | 20 | 100 | 29.0 | 223.0 | 0.745 | 0.495 | 5.033 |
| | 2 | 85 | 4 | 5 | 10 | 100 | 33.6 | 239.9 | 0.712 | 0.521 | 8.561 |
| | 3 | 65 | 4 | 5 | 30 | 100 | 31.7 | 226.8 | 0.690 | 0.159 | 2.174 |
| | 4 | 95 | 4 | 5 | 0 | 100 | 34.7 | 242.3 | 0.687 | 0 | 0 |
| | 5 | 85 | 4 | 15 | 0 | 100 | 29.7 | 224.8 | 0.731 | 0 | 0 |
| | 6 | 95 | — | 0 | 5 | 100 | 40.2 | 249.8 | 0.665 | — | 19.221 |
| | 7 | 90 | — | 0 | 10 | 100 | 38.3 | 247.9 | 0.634 | — | 9.112 |
| | 8 | 85 | — | 0 | 15 | 100 | 32.8 | 244.4 | 0.721 | — | 5.711 |
| | 9 | 50 | — | 0 | 50 | 100 | 10.8 | 191.4 | 0.734 | — | 1.143 |
| | 10 | 100 | — | 0 | 0 | 100 | 45.3 | 254.1 | 0.614 | 0 | 0 |

TABLE 4

| | Peak at 8.4 ppm (third recurring unit) | Peak at 4.4 ppm (first recurring unit) | Peak at 2.4 ppm (second recurring unit) |
|---|---|---|---|
| Integral value | 1.0210 | 0.1758 | 0.5149 |
| Actual value of molar ratio | Y = 5.808 | 1 | X = 2.929 |
| Theoretical value of molar ratio | 6 | 1 | 3 |

As shown in Table 3, in the process for preparing the copolyesters of Examples 1 to 9, the reactants were controlled in specific molar ranges (i.e., the aliphatic dicarboxylic acid or the ester thereof was in an amount ranging from 15 mol % to 30 mol %, and the oxalic acid or the ester thereof was in an amount ranging from 10 mol % to 30 mol % based on a total molar amount of the oxalic acid or the ester thereof, the aliphatic dicarboxylic acid or the ester thereof, and the aromatic dicarboxylic acid or the ester thereof). Furthermore, as shown in Tables 3 and 4, because the reactants for preparing the copolyesters of Examples 1 to 9 were controlled in specific molar ranges, the copolyesters of Examples 1 to 9 with the first, second, and third recurring units having specific molar ratios thereamong (i.e., molar ratio X ranging from 0.5 to 3 and the molar ratio Y ranging from 1.3 to 8) were obtained.

In the process for producing the copolyesters of Comparative Examples 1 to 10, the reactants were not controlled In view of the aforesaid, by controlling the reactants for preparing the copolyester in specific molar ranges, the copolyester with the first, second, and third recurring units having specific ratios thereamong can be obtained, thereby conferring the copolyester of this disclosure with a melting point (Tm) lower than 220° C. and a lattice enthalpy (Hm) greater than 12 J/g.

In the description above, for the purposes of explanation, numerous specific details have been set forth in order to provide a thorough understanding of the embodiment(s). It will be apparent, however, to one skilled in the art, that one or more other embodiments may be practiced without some of these specific details.

It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A copolyester having a low melting point and a high crystallinity, comprising:
   a first recurring unit represented by Formula (I);
   a second recurring unit represented by Formula (II); and
   a third recurring unit represented by Formula (III),

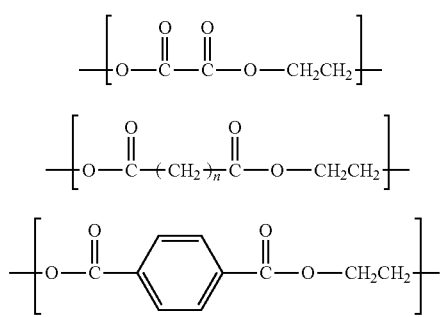

wherein
   n is an integer in a range of 1 to 12;
   a molar ratio of said first recurring unit to said second recurring unit is in a range from 1:0.5 to 1:3; and
   a molar ratio of said first recurring unit to said third recurring unit is in a range from 1:1.3 to 1:8; and
   wherein the copolyester has a melting point lower than 220° C. and a lattice enthalpy greater than 12 J/g.

2. The copolyester according to claim 1, wherein n is an integer selected from the group consisting of 1, 2, 3, 4, 5, 6, 7, 8, 10, and 12.

3. The copolyester according to claim 2, wherein n is an integer selected from the group consisting of 2, 4, 6, 8, 10, and 12.

4. The copolyester according to claim 2, wherein n is an integer selected from the group consisting of 3, 4, and 10.

5. A process for producing a copolyester having a low melting point and a high crystallinity, comprising the steps of:
   a) subjecting ethylene glycol to a reaction with oxalic acid or an ester thereof to form a first reaction product, the oxalic acid or the ester thereof being represented by $R^1OOC-COOR^2$, in which each of $R^1$ and $R^2$ is independently hydrogen or an alkyl group;
   b) subjecting ethylene glycol to a reaction with an aliphatic dicarboxylic acid or ester thereof to form a second reaction product, the aliphatic dicarboxylic acid or the ester thereof being represented by $R^3OOC-(CH_2)_n-COOR^4$, in which n is an integer of from 1 to 12, and each of $R^3$ and $R^4$ is independently hydrogen or an alkyl group;
   c) subjecting ethylene glycol to a reaction with an aromatic dicarboxylic acid or ester thereof to form a third reaction product, the aromatic dicarboxylic acid or ester thereof being represented by

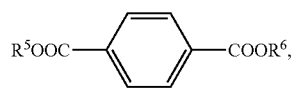

in which each of $R^5$ and $R^6$ is independently hydrogen or an alkyl group; and
   d) subjecting the first reaction product, the second reaction product, and the third reaction product to a polycondensation reaction,
   wherein
   the aliphatic dicarboxylic acid or the ester thereof is in an amount ranging from 15 mol % to 30 mol %, and the oxalic acid or the ester thereof is in an amount ranging from 10 mol % to 30 mol % based on a total molar amount of the oxalic acid or the ester thereof, the aliphatic dicarboxylic acid or the ester thereof, and the aromatic dicarboxylic acid or the ester thereof.

6. The process according to claim 5, wherein steps a), b), and c) are implemented by mixing the ethylene glycol, the oxalic acid or the ester thereof, the aliphatic dicarboxylic acid or the ester thereof, and the aromatic dicarboxylic acid or the ester thereof.

7. The process according to claim 5, wherein n is an integer selected from the group consisting of 1, 2, 3, 4, 5, 6, 7, 8, 10, and 12.

8. The process according to claim 7, wherein n is an integer selected from the group consisting of 2, 4, 6, 8, 10, and 12.

9. The process according to claim 7, wherein n is an integer selected from the group consisting of 3, 4, and 10.

10. A fiber having a low melting point and a high crystallinity, which is made from a composition including said copolyester of claim 1.

* * * * *